US012798510B2

(12) United States Patent
Isaksson

(10) Patent No.: US 12,798,510 B2
(45) Date of Patent: Nov. 17, 2026

(54) WINDSHIELD SYSTEM FOR A VEHICLE

(71) Applicant: Volvo Car Corporation, Gothenburg (SE)

(72) Inventor: Fredrik Isaksson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 19/256,284

(22) Filed: Jul. 1, 2025

(65) Prior Publication Data

US 2026/0008430 A1 Jan. 8, 2026

(30) Foreign Application Priority Data

Jul. 5, 2024 (EP) .................................... 24186891

(51) Int. Cl.

| | |
|---|---|
| ***B60R 21/34*** | (2011.01) |
| ***B60J 1/02*** | (2006.01) |
| ***B60R 1/04*** | (2006.01) |
| *B60R 11/00* | (2006.01) |
| *B60R 21/00* | (2006.01) |

(52) U.S. Cl.

CPC ................ *B60R 21/34* (2013.01); *B60J 1/02* (2013.01); *B60R 1/04* (2013.01); *B25D 2250/271* (2013.01); *B25D 2250/295* (2013.01); *B60R 2011/0026* (2013.01); *B60R 2021/0004* (2013.01); *B60R 2021/343* (2013.01)

(58) Field of Classification Search

CPC ... B60R 21/34; B60R 21/00; B60R 2021/343; B60R 2021/346; B60R 2021/0004; B60R 2011/0026; B60R 1/02; B60R 1/04; B60J 1/02; B60J 1/00; B25D 2250/271; B25D 2250/295; B25D 17/00; B25D 2209/00; B25D 2211/00

USPC .............. 180/271, 274; 296/84.1, 90, 96.21, 296/96.22, 190.1, 187.04

See application file for complete search history.

(56) References Cited

U.S. PATENT DOCUMENTS 9,993,999 B2 * 6/2018 Alonso Vazquez .......................... B32B 17/10761
2003/0227192 A1 * 12/2003 Okamoto ................ B60R 21/34 296/96.22

(Continued)

FOREIGN PATENT DOCUMENTS

CN 105128795 A * 12/2015 ............ B60R 21/01
CN 219523846 U 8/2023

(Continued)

OTHER PUBLICATIONS

Dec. 10, 2024 European Search Report issued in corresponding EP Application No. 24186891.

*Primary Examiner* — Keith J Frisby
(74) *Attorney, Agent, or Firm* — Clements Bernard Walker; Christopher L. Bernard

(57) ABSTRACT

A windshield system for a vehicle, the windshield system including: a windshield; a component arrangement, the component arrangement being attached to the windshield and including one or more components, the one or more components relating to at least one of: a rear-view device or a sensor; and a weakening arrangement configured to weaken a structural integrity of the windshield in case the vehicle is about to collide with a vulnerable road user, the weakening arrangement being arranged adjacent to and/or inside the component arrangement.

16 Claims, 1 Drawing Sheet

(56) References Cited

U.S. PATENT DOCUMENTS

| | | | | |
|---|---|---|---|---|
| 2006/0138798 | A1* | 6/2006 | Oehrlein | B32B 17/10036 296/84.1 |
| 2007/0216768 | A1* | 9/2007 | Smith | B60R 11/04 348/118 |
| 2012/0224065 | A1* | 9/2012 | Schofield | H04N 7/18 348/148 |
| 2013/0091779 | A1* | 4/2013 | Dominique | B60J 1/008 52/1 |
| 2023/0114533 | A1 | 4/2023 | Kasarla | |
| 2024/0286463 | A1* | 8/2024 | Shimomura | B60J 1/001 |
| 2025/0031578 | A1* | 1/2025 | Renke | H10N 30/072 |

FOREIGN PATENT DOCUMENTS

| | | | | | |
|---|---|---|---|---|---|
| DE | 102006028484 | A1 | * | 12/2007 | B32B 17/10036 |
| DE | 102010024959 | A1 | * | 12/2011 | B60J 1/02 |
| DE | 102011113512 | A1 | * | 3/2012 | B60R 21/34 |
| DE | 102011005294 | A1 | * | 9/2012 | B60R 21/34 |
| DE | 102011119105 | A1 | * | 5/2013 | B60R 21/34 |
| DE | 102014210607 | A1 | * | 12/2015 | B60W 30/085 |
| DE | 102014215788 | A1 | * | 2/2016 | B60J 1/02 |
| DE | 102017210110 | A1 | * | 12/2018 | B60R 21/0134 |
| DE | 102018212352 | A1 | * | 3/2019 | B60J 1/008 |
| DE | 102020112373 | A1 | * | 11/2021 | B60R 21/34 |
| DE | 102020114695 | A1 | * | 12/2021 | B32B 17/10036 |
| DE | 102020206687 | A1 | * | 12/2021 | B32B 17/10137 |
| DE | 102020118985 | A1 | * | 1/2022 | B60R 21/34 |
| DE | 102021210928 | A1 | * | 3/2023 | C03C 15/00 |
| EP | 2581243 | B1 | * | 10/2019 | B60R 21/34 |
| FR | 2892079 | A1 | * | 4/2007 | B60R 21/34 |
| JP | 2007001407 | A | * | 1/2007 | |
| JP | 2008133141 | A | * | 6/2008 | |
| JP | 2008189095 | A | * | 8/2008 | |
| JP | 2008189096 | A | * | 8/2008 | |
| JP | 2018138433 | A | * | 9/2018 | |
| KR | 2001055597 | A | * | 7/2001 | |
| WO | WO-2019245819 | A1 | * | 12/2019 | B32B 17/1022 |
| WO | 2020005554 | A1 | | 1/2020 | |
| WO | WO-2025103437 | A1 | * | 5/2025 | B60R 11/00 |
| WO | WO-2025133627 | A1 | * | 6/2025 | B23K 26/082 |

* cited by examiner

WINDSHIELD SYSTEM FOR A VEHICLE

CROSS-REFERENCE TO RELATED APPLICATION

The present disclosure claims the benefit of priority of co-pending European Patent Application No. 24 186 891.8, filed on Jul. 5, 2024, and entitled "WINDSHIELD SYSTEM FOR A VEHICLE," the contents of which are incorporated in full by reference.

TECHNICAL FIELD

The present disclosure relates to a windshield system for a vehicle, and a vehicle.

BACKGROUND

Cars become safer and safer every year. Nowadays they are equipped with air bags, belts, alarms for detecting a nearby obstruction. Mostly, the safety measures are meant to protect the car driver and the car passengers. However, there are also safety measures to prevent accidents with vulnerable road users such as pedestrians and cyclists. One example of such safety measure is automated braking of the car in case of a detection of a pedestrian on the road ahead of the car. In such a case, the car may start braking even before the driver becomes aware of the danger. Even with such safety measures in place, it may occur that a vulnerable road user hits the windshield in case of an accident.

Due to various factors such as material and shape, typically convex form, modern windshields of cars are relatively strong and can cause serious injuries when a vulnerable road user, specifically a pedestrian or cyclist without helmet, impacts the windshield. Hence, there is a need for further improvement of the safety of cars and other vehicles to decrease the number of serious injuries.

A known solution for this problem is described in EP2581243B1. This European patent describes a windshield for a vehicle characterized in that the windshield includes weakening means arranged to weaken said windshield so that the windshield collapses in a controlled manner in the event of the vehicle colliding with a pedestrian and the pedestrian being in the vicinity of the windshield, wherein said weakening means includes: a pyrotechnic device arranged to damage said windshield; a sensor arranged to detect the pedestrian in the vicinity of said windshield; a control module arranged to activate said pyrotechnic device if said pedestrian is detected and said vehicle has a predetermined minimal speed.

However, there may still be a need to improve the integration of such safety measures in the vehicle.

SUMMARY

The problem is at least partially solved or alleviated by the subject matter of the present disclosure.

According to a first aspect, there is provided a windshield system for a vehicle. The windshield system includes a windshield. Further, the windshield system includes a component arrangement, the component arrangement being attached to the windshield and including one or more components, the one or more components relating to at least one of: a rear-view device or a sensor. Moreover, the windshield system includes a weakening arrangement configured to weaken a structural integrity of the windshield in case the vehicle is about to collide with a vulnerable road user, the weakening arrangement being arranged adjacent to and/or inside the component arrangement.

By arranging the weakening arrangement adjacent to and/or inside the component arrangement, the weakening arrangement is conveniently located inside or next to an already existing component arrangement of the vehicle, namely one relating to a rear-view device and/or sensor. Hence, the weakening arrangement does not obscure or cluster the windshield as an additional part, which should be free for the driver and passengers to have a clear view during driving. Moreover, the particular arrangement adjacent to and/or inside the proposed component arrangement allows for a quick and reliable structural weakening of the windshield, allowing to increase the safety of vulnerable road users, including pedestrians, cyclists and motorcyclists.

That the one or more component relates to at least one of a rear-view device or a sensor means that one component of the component arrangement may be a rear-view device or a sensor as such or that the component functionally and/or structurally relates to a rear-view device or a sensor. For example, as explained further below, the component may be a mounting element of a rear-view device, which thus relates to a rear-view device, as it structurally attaches thereto. Another example, for a sensor, would be a circuitry, cables or similar of the sensor, which may be components of the component arrangement, whereas the sensor may be located elsewhere, e.g., in the rear-view device or as part thereof.

Generally, the rear-view device may be or include a rear-view mirror. But also, it may be equipped with one or more electronical devices, such as a camera, a display, electronic dimming equipment for dimming the rear-view mirror, and similar.

Generally, the sensor may be one or more sensors, meaning that there may be more than one sensor provided inside the component arrangement or one or more components may be relating to multiple sensors. Generally, the type of sensor may be of any type useful for applications in a vehicle, such as but not limited to camera sensors, any sensors for autonomous driving functions, such as radar, rain sensor, condensation sensor, etc.

The weakening arrangement being configured to weaken the structural integrity of the windshield in particular means that the weakening arrangement can weaken the structural integrity of the windshield in a way which reduces a force with which the windshield counters the impact of the vulnerable road user, e.g., the head of the vulnerable road user. Specifically, when the windshield is not structurally weakened, it may be able to break only when subject to a very high force and from that moment absorb at least some of the impact energy by deformation. However, when the vulnerable road user, e.g., the head of the vulnerable road user, is subjected to such high force or generally the windshield does not absorb at least some of the impact force or energy by deformation, the vulnerable road user may be severely injured. By weakening the structural integrity, which is what holds together the windshield if it is not damaged, the windshield can start to absorb impact energy by absorption at lower impact forces or beginning with the impact of the vulnerable road user. Still, the windshield does not necessarily need to be severely fragmented or cracked by the weakening arrangement, although this can be done in an implementation of this disclosure. Instead, it may be sufficient to provide a breaking point by the weakening arrangement inside the windshield, which can normally not be provided or not be sufficient for the impact situation with a vulnerable road user, e.g., because for high driving speeds, at which the safety of the passengers could otherwise not be ensured. When the vulnerable road user hits the windshield, that breaking point may break and absorb the impact energy, thus reducing the impact force and energy that the vulnerable road user is subjected to for reducing the risk and severity of injuries. Also, it may be provided that the weakening arrangement is configured such that the windshield collapses, in particular in a controlled manner, when weakening its structural integrity by the weakening arrangement and/or upon impact with a vulnerable road user.

That the weakening arrangement is arranged inside the component arrangement may include that parts of the weakening arrangement or the entire weakening arrangement, i.e., with all of its components, is arranged inside the component arrangement, in particular inside a component housing of the component arrangement. Alternatively, that the weakening arrangement is arranged adjacent to the component arrangement may include that parts of the weakening arrangement or the entire weakening arrangement, i.e., with all of its components, is arranged outside the component arrangement, in particular outside a component housing of the component arrangement, but adjacent to or, in other words, in proximity to the component arrangement. Also, it may be possible that the weakening arrangement, in particular with components thereof, is partially arranged adjacent to the component arrangement and partially arranged inside the component arrangement. Adjacent to may mean directly adjacent to or indirectly adjacent, e.g., with one arrangement or minor space in between. For example, adjacent may include a distance of up to 20 cm, in particular up to 10 cm or up to 5 cm, or less.

In particular, the weakening arrangement and/or the component arrangement may be arranged at an inner side or inside of the windshield. The inner side or inside of the windshield is oriented towards or, in other words, faces the cabin of the vehicle. This is opposed to the outer side or outside of the windshield, which is oriented towards or, in other words, faces the exterior of the vehicle.

In an example, the weakening arrangement may be at least partially arranged inside a component housing of the component arrangement. Thereby, the weakening arrangement may be protected and hidden from sight, e.g., to avoid manipulation thereof and allow for a tidy windshield without obstruction of the viewing area through the windshield. Specifically, the component housing is being used to also house the weakening arrangement, reducing the number of required housings or covers at or near the windshield.

In an example, the component housing may be at least partially configured as a mirror trim of a mounting element of the rear-view device. The mounting element, e.g., a mirror foot, may be mountable or mounted to the windshield, specifically from an inner side thereof, the inner side of the windshield being inside a cabin of the vehicle as opposed to an outer side thereof towards the exterior of the vehicle. The mounting element may be one of the components of the component arrangement. Any mounting technique such as but not limited to adhesive mounting or mechanical fastening may be used by means of which the mounting element may be attached to the windshield, specifically its inner side. The rear-view device may be attached to the windshield via the mounting element. The mirror trim may be used to cover the mounting element at least partially or fully. The mirror trim may not only cover the mounting element but also any additional part located at or in the proximity of the mounting element, such as the sensor or multiple sensors or any of their equipment, e.g., cable, circuitry, etc. Advantageously, the mirror trim thereby also houses the weakening arrangement.

In an example, additionally or alternatively, the component housing may be at least partially configured as a sensor trim for the sensor. The sensor may be one of the components. For example, the component housing may be a sensor trim for one or more sensors, or it may be a combined sensor and mirror trim for both, one or more sensors and a mounting element of the rear-view device. Specifically, there are vehicles which typically do not have a rear-view mirror, such as trucks or cargo cars. However, modern trucks may still have one or more sensors in the windshield area and here, despite the lack of the rear-view mirror, it may be advantageous to position the weakening structure inside the trim of the one or more sensors.

In an example, the windshield system may further include a headliner, the weakening arrangement being at least partially arranged inside the headliner. The weakening arrangement may be arranged in the headliner only or, alternatively, partially in the headliner and partially in a trim, e.g., sensor trim and/or mirror trim. Thereby the weakening arrangement may partially or fully be adjacent to the component arrangement or partially be arranged inside the component arrangement. In any case, the headliner provides for much space for the weakening arrangement, which is typically not or only in a limited manner utilized. Hence, the available space at the headliner may be used to arrange the weakening arrangement therein, thereby covering it from sight while still allowing it to function properly. For example, the weakening device as described further below may be actuated, e.g., extended, out of the headliner such that it impacts the windshield.

In an example, the weakening arrangement may include a weakening housing arranged adjacent to and/or inside the component arrangement. Such weakening housing may be in addition or as part of any other housing, specifically mirror trim, sensor trim and/or headliner, as mentioned herein, to cover and protect the weakening arrangement.

In an example, the weakening arrangement may include an actuator and a weakening device. The actuator may be configured to actuate the weakening device for weakening the structural integrity of the windshield. The weakening device may have any shape and material. Merely as a non-limiting example, the weakening device may be in the form of or including a tip and/or made from diamond or any other hard material. Generally, the tip of the weakening device may be sharp, blunt, anything in between or in other configuration. The actuator may for example be any one or more from a: pyrotechnical device, an electric motor, a mechanical load, e.g., one or more loaded mechanical springs such as leaf springs or coil springs, a hydraulic load, e.g., pre-loaded hydraulic load in a chamber or an applied load from a hydraulic cylinder, a pneumatic and/or gaseous load, e.g., as a pre-loaded pneumatic load in a chamber or an applied load from a pneumatic cylinder.

In an example, the actuator may be configured to receive a trigger signal to actuate the weakening device, the trigger signal indicating that the vehicle, in particular the windshield, is about to collide or is colliding with the vulnerable road user. For example, the windshield system may include a trigger device for generating, providing and/or forwarding the trigger signal to the actuator upon collision or based on a prediction of a collision with the vulnerable road user. For example, such trigger device may be a data processing apparatus, such as a computer or microcontroller, which may be connected to one or more sensors, e.g., cameras, radar sensors, crash sensors, and similar, which may be located inside or outside of the component arrangement. Hence, the trigger device may receive one or more sensor signals indicative of the environment of the vehicle or an imminent or occurring crash or collision situation. For example, the data processing apparatus may be configured to predict or determine that a crash is imminent with a pedestrian as a vulnerable road user based on image recognition techniques applied on images received from a camera and one or more measurements, e.g., position, speed and similar of the vehicle and the vulnerable road user, speed of the vehicle. In this case, the data processing apparatus may generate the trigger signal for the actuator such that the windshield is weakened in its structural integrity, e.g., by impacting the windshield with the weakening device, e.g., a diamond tip. However, also less sophisticated solutions may be used. For example, the actuator may be directly connected to one or more sensors, e.g., crash or, in other words, impact sensors at the front of the vehicle, e.g., on or near a front bumper, hood or similar of the vehicle. Upon detection of a crash or, in other words, collision in this area, the one or more sensors, in particular one or more sensors, may provide the trigger signal to the actuator.

In an example, the trigger signal may be further indicating that the vehicle is travelling within a predetermined speed range. In other words, the receival or generation of the trigger signal may only be caused if the vehicle is travelling within a predetermined speed range. For example, the predetermined speed range may be a minimum speed range or include a minimum speed, e.g., 10, 15, 20 or more km/h or anything in between. Thereby, it may be avoided that the windshield is weakened in its structural integrity in potential or actual collision situations, in which a vulnerable road user is less likely to take any or severe injuries. Also, at very high speeds, the safety measure of weakening the windshield may not be useful and not be applied, hence, the predetermined speed range may have a maximum speed range, e.g., of 100, 120 or more km/h, for example.

In an example, the windshield system may further include a trigger arrangement configured to transmit the trigger signal to the actuator. The trigger arrangement may for example include or be the trigger device, e.g., data processing apparatus, as explained herein.

In an example, the weakening arrangement may be configured to weaken the structural integrity of the windshield by moving the weakening device along a surface of the windshield. Specifically, the weakening device may be moved along a line, e.g., straight, or curved line. For example, such line may be a break line, which may already include an intended weakening or breaking point or area, specifically line. However, this is not necessary, and the weakening of the structural integrity may also come from the weakening device only. For example, the weakening device may be configured to scratch the windshield, e.g., at its inner side. For this purpose, the weakening device may include the mentioned diamond tip or similar. When moving the weakening device along the surface of the windshield, the windshield will be scratched, and its structural integrity will be weakened for the occurring or imminent impact with the vulnerable road user. The movement of the weakening device along the surface of the windshield allows for a comparatively compact weakening arrangement due to the little height it requires in construction space.

In an example, the weakening arrangement may be configured to linearly or rotationally move the weakening device along the surface of the windshield. Thereby, geometrically well-defined movements of the weakening device are executed, which may be well actuated by inexpensive actuators and are effective in weakening the structural integrity of the windshield.

In an example, the weakening arrangement may be configured to weaken the structural integrity of the windshield by impacting a spot of the windshield with the weakening device. The weakening by impacting a spot of the windshield, as opposed to, for example, a line along which the weakening device is being moved, allows for a particularly quick weakening of the structural integrity of the windshield with a high force. Also here, for example, a diamond tip as part of the weakening device or any other geometry and material of a portion of the weakening device impacting the spot of the windshield may be used.

In an example, the weakening structure may be configured to linearly or rotationally move the weakening device for impacting the spot of the windshield. Thereby, geometrically well-defined movements of the weakening device are executed, which may be well actuated by inexpensive actuators and are effective in weakening the structural integrity of the windshield.

According to a second aspect, there is provided a vehicle including the windshield system of the first aspect of this disclosure.

The vehicle may be any vehicle such as but not limited to a car, a truck, or similar.

It is noted that the above examples may be combined with each other irrespective of the aspect involved.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

DETAILED DESCRIPTION

The figures are merely schematic representations and serve only to illustrate examples of the disclosure. Identical or equivalent elements are in principle provided with the same reference signs.

Figure 1:
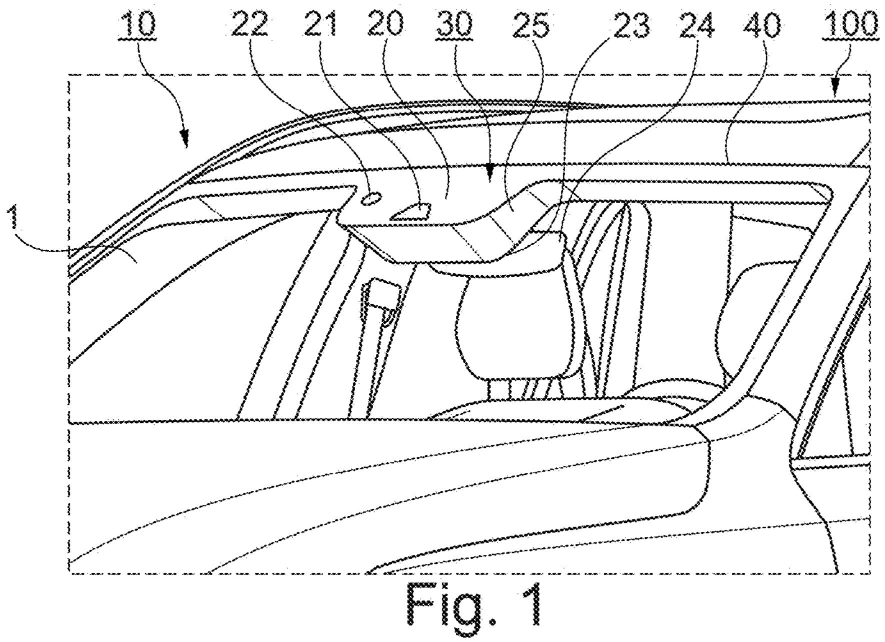
FIG. 1 shows a perspective view on a front portion of a vehicle with a windshield system.

FIG. 1 shows a perspective view of a front portion of a vehicle 100 with a windshield system 10. In this example, the vehicle 100 is exemplarily shown as a car but alternatively may be any other type of vehicle 100, in particular road vehicle, such as a truck, for example.

The windshield system 10 includes a windshield 1 or, in other words, a windscreen with an outer side and an inner side towards the cabin of the vehicle 100. A component arrangement 20 of the windshield system 10 is provided at the inner side of the windshield 1. In particular, the component arrangement 20 is attached to the inner side of the windshield 1.

The component arrangement 20 may include one or more components 21, 22, 23. In this example, three exemplary components 21, 22, 23 are shown. Component 21 is a sensor, e.g., a camera or radar sensor of the vehicle 100, for example. Also, component 22 is a sensor, e.g., a rain sensor for activating windscreen wipers (not shown). Component 23 is a mounting element 23 for the rear-view device 24 shown in FIG. 1. The rear-view device 24 may be or include a rear-view mirror and/or one or more electronic components, such as a display, sensor, and similar, for example.

In the example of FIG. 1, the components 21, 22, 23 are housed within a component housing 24. This component housing 24 may be at least partially configured as a mirror trim for the component 23 configured as the mounting element of the rear-view device 24.

Figure 2:
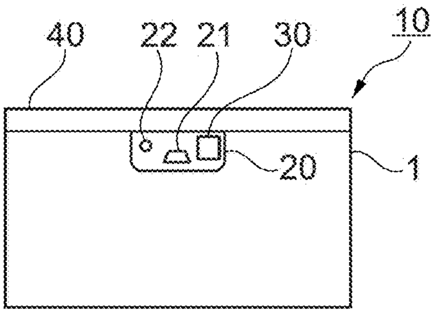
FIG. 2 shows an example of a windshield system.
Figure 3:
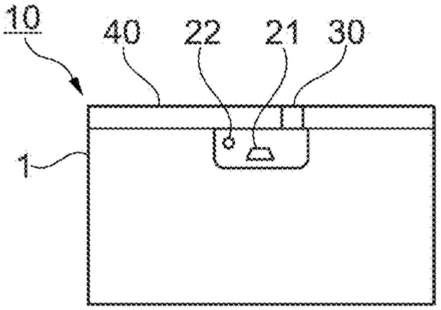
FIG. 3 shows another example of a windshield system.

As further illustrated in FIGS. 1 to 3, the windshield system 20 as shown in FIG. 1 may include a weakening arrangement 30. The weakening arrangement 30 may be configured to weaken a structural integrity of the windshield 1 in case the vehicle 100 is about to collide with a vulnerable road user (not shown), such as a pedestrian or a cyclist. Generally, the weakening arrangement 30 may be arranged adjacent to and/or inside the component arrangement 20, in particular the component housing 24. This means that the entire weakening arrangement 30 may be arranged adjacent to or inside the component arrangement 20, in particular the component housing 24, or part of the weakening arrangement 30 may be arranged adjacent to the component arrangement 20 and another part of the weakening arrangement 30 may be arranged inside the component arrangement 20.

In FIG. 2, the weakening arrangement 30 is exemplarily arranged inside the component arrangement 20, in particular inside the component housing 20, e.g., a mirror trim. In FIG. 3, on the other hand, the weakening arrangement 30 is arranged inside a headliner 40 of the windshield system 10, in particular inside at a portion of the headliner 40 adjacent to, in particular directly adjacent to, the component arrangement 20. Alternatively, the weakening arrangement 20 may be partially arranged in both, the component arrangement 20 and the headliner 40 adjacent to the component arrangement 20, for example. Also, it may be possible to provide a separate weakening housing for the weakening arrangement 30, which may be located adjacent to the component arrangement 20, in particular the component housing 25, and on the windshield 1.

Figure 4A:
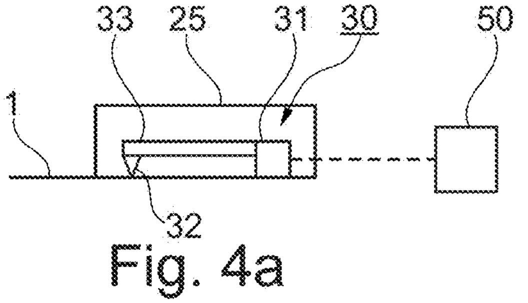
FIGS. 4*a*-4*c* show examples of a weakening arrangement for the windshield system of any one of FIGS. 1 to 3.

As schematically shown in FIG. 4*a*, the weakening arrangement 30 may include an actuator 31 and a weakening device 32. Further, as exemplarily shown here, the actuator 31 may be functionally connected with the weakening device 32 by one or more connecting elements 33. The actuator 31 may be configured to actuate the weakening device 32 for weakening the structural integrity of the windshield 1. Specifically, the windshield system 1 may further include a trigger arrangement 50 configured to transmit a trigger signal indicating that the vehicle 100, in particular the windshield 1, is about to collide or is colliding with a vulnerable road user. Upon receiving the trigger signal, the actuator 31 may actuate the weakening device 32 to weaken the structural integrity of the windshield 1. For example, the weakening device 32 may be configured as or with a sharp tip, e.g., a diamond tip.

Figure 4B:
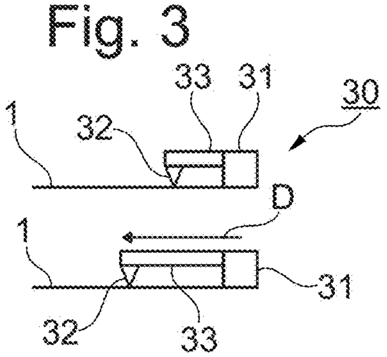
Figure 4C:
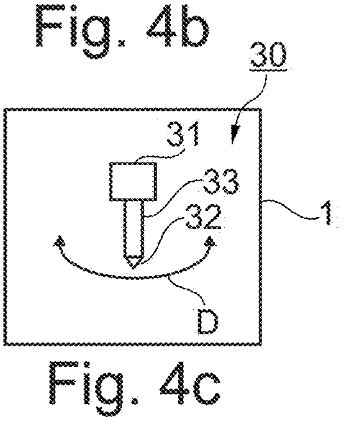

For example, as shown schematically in FIG. 4*b*, the actuator 31 may be configured to linearly move the weakening device 32 along a direction D and on or along the surface of the windshield 1, thereby scratching the windshield 1 and weakening its structural integrity. For example, the connecting element 32 may be extendible by means of the actuator 31, e.g., as a hydraulic or pneumatic cylinder. FIG. 4*c* shows an example in which, instead of a linear motion, a rotary motion in one or more opposite directions D may be carried out by the actuator 31 to scratch the surface of the windshield 1.

Figure 5:
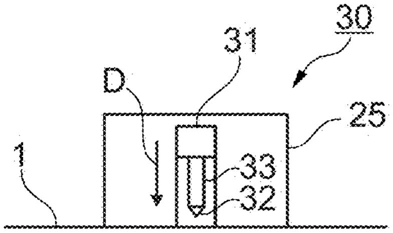
FIG. 5 shows another example of a weakening arrangement for the windshield system of any one of FIGS. 1 to 3.

FIG. 5 shows an alternative weakening arrangement 30 with the weakening device 32 being configured to impact a spot of the windshield 1. In the example of FIG. 5, the weakening device 32 is accelerated by the actuator 31 along a linear direction D or, in other words, in a linear motion. Alternatively, similarly to FIG. 4*c*, the motion of the weakening device 32 may be configured to be rotational to impact the spot of the windshield 1.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A windshield system for a vehicle, the windshield system comprising:

a windshield;

a component arrangement, the component arrangement being attached to the windshield and comprising one or more components, the one or more components relating to at least one of: a rear-view device or a sensor; and a weakening arrangement configured to weaken a structural integrity of the windshield in case the vehicle is about to collide with a vulnerable road user, the weakening arrangement being arranged adjacent to and/or inside the component arrangement, wherein the weakening arrangement comprises an actuator and a weakening device, the actuator being configured to actuate the weakening device for weakening the structural integrity of the windshield by moving the weakening device along a surface of the windshield to scratch the surface of the windshield or impacting a spot of the windshield with a point of the weakening device.

2. The windshield system of claim 1, wherein the weakening arrangement is at least partially arranged inside a component housing of the component arrangement.

3. The windshield system of claim 2, wherein the component housing is at least partially configured as a mirror trim of a mounting element of the rear-view device.

4. The windshield system of claim 2, wherein the component housing is at least partially configured as a sensor trim for the sensor.

5. The windshield system of claim 1, wherein the windshield system further comprises a headliner, the weakening arrangement being at least partially arranged inside the headliner.

6. The windshield system of claim 1, wherein the weakening arrangement comprises a weakening housing arranged adjacent to and/or inside the component arrangement.

7. The windshield system of claim 1, wherein the actuator is configured to receive a trigger signal to actuate the weakening device, the trigger signal indicating that the windshield is about to collide with the vulnerable road user.

8. The windshield system of claim 7, wherein the trigger signal is further indicating that the vehicle is travelling within a predetermined speed range.

9. The windshield system of claim 7, wherein the windshield system further comprises a trigger arrangement configured to transmit the trigger signal to the actuator.

10. The windshield system of claim 1, wherein the weakening arrangement is configured to linearly or rotationally move the weakening device along the surface of the windshield.

11. The windshield system of claim 1, wherein the weakening arrangement is configured to linearly or rotationally move the weakening device for impacting the spot of the windshield.

12. A vehicle comprising:

a windshield system comprising:

a windshield;

a component arrangement, the component arrangement being attached to the windshield and comprising one or more components, the one or more components relating to at least one of: a rear-view device or a sensor; and a weakening arrangement configured to weaken a structural integrity of the windshield in case the vehicle is about to collide with a vulnerable road user, the weakening arrangement being arranged adjacent to and/or inside the component arrangement, wherein the weakening arrangement comprises an actuator and a weakening device, the actuator being configured to actuate the weakening device for weakening the structural integrity of the windshield by moving the weakening device along a surface of the windshield to scratch the surface of the windshield or impacting a spot of the windshield with a point of the weakening device.

13. The vehicle of claim 12, wherein the weakening arrangement is at least partially arranged inside a component housing of the component arrangement.

14. The vehicle of claim 13, wherein the component housing is one or more of:

at least partially configured as a mirror trim of a mounting element of the rear-view device; and at least partially configured as a sensor trim for the sensor.

15. The vehicle of claim 12, wherein the windshield system further comprises a headliner, the weakening arrangement being at least partially arranged inside the headliner.

16. The vehicle of claim 12, wherein the weakening arrangement comprises a weakening housing arranged adjacent to and/or inside the component arrangement.

* * * * *